(12) United States Patent
Chung et al.

(10) Patent No.: US 9,477,891 B2
(45) Date of Patent: Oct. 25, 2016

(54) SURVEILLANCE SYSTEM AND METHOD BASED ON ACCUMULATED FEATURE OF OBJECT

(71) Applicant: BEST DIGITAL.CO., LTD., Gyeonggi-do (KR)

(72) Inventors: Kyung Ho Chung, Gwangmyeong-si (KR); Jae Yong Park, Anyang-si (KR); Young Suk Park, Anyang-si (KR)

(73) Assignee: BEST DIGITAL.CO., LTD., Gyeonggi-Do (KR)

( * ) Notice: Subject to any disclaimer, the term of this patent is extended or adjusted under 35 U.S.C. 154(b) by 63 days.

(21) Appl. No.: 14/675,756

(22) Filed: Apr. 1, 2015

(65) Prior Publication Data

US 2016/0283797 A1    Sep. 29, 2016

(30) Foreign Application Priority Data

Apr. 1, 2014    (KR) ................. 10-2014-0038726

(51) Int. Cl.
| | |
|---|---|
| *G06K 9/00* | (2006.01) |
| *H04N 7/18* | (2006.01) |
| *G06K 9/20* | (2006.01) |
| *G06K 9/62* | (2006.01) |
| *G06K 9/46* | (2006.01) |
| *H04N 5/225* | (2006.01) |

(52) U.S. Cl.
CPC ......... *G06K 9/00771* (2013.01); *G06K 9/2054* (2013.01); *G06K 9/4642* (2013.01); *G06K 9/6202* (2013.01); *G06K 9/6255* (2013.01); *H04N 7/181* (2013.01)

(58) Field of Classification Search
CPC ............. G06K 9/00; H04N 5/00; H04N 7/00
USPC ........ 382/103, 107, 236; 348/169, 170, 171, 348/172, 352
See application file for complete search history.

(56) References Cited

U.S. PATENT DOCUMENTS 7,969,470 B2 *   6/2011   Kishida .............. G06K 9/00771
                                                348/153
8,300,890 B1 *  10/2012   Gaikwad ................ H04N 5/144
                                                382/103

FOREIGN PATENT DOCUMENTS

| KR | 10-2006-0100341 A | 9/2006 |
|---|---|---|
| KR | 10-0744668 B1 | 7/2007 |
| KR | 10-2010-0025338 A | 3/2010 |

* cited by examiner

*Primary Examiner* — Abolfazl Tabatabai
(74) *Attorney, Agent, or Firm* — Revolution IP, PLLC (57) ABSTRACT

Disclosed is a surveillance system and method based on accumulated features of objects. The surveillance system ensures and accumulatively stores a plurality of data about feature information corresponding to an object picked up by a plurality of cameras and easily identifies the same object in an image taken by another camera having a surveillance area different from those of the plurality of cameras on the basis of the data, thereby allowing for continuous tracing.

12 Claims, 8 Drawing Sheets

SURVEILLANCE SYSTEM AND METHOD BASED ON ACCUMULATED FEATURE OF OBJECT

CROSS-REFERENCE TO RELATED APPLICATIONS

This application claims the priority of Korean Patent Application No. 10-2014-0038726 filed on Apr. 1, 2014, in the Korean Intellectual Property Office, the disclosure of which is incorporated herein by reference.

BACKGROUND OF THE INVENTION

1. Field of the Invention

The present invention relates to a surveillance system and method based on accumulated features of an object, and more particularly, to a surveillance system and method based on accumulated features of an object which can monitor a wide area by accumulatively storing features of a specific object with various types of cameras and performing surveillance continuously and interactively on the basis of the features.

2. Description of the Related Art

With development of various types of video equipment, an intellectual surveillance system that identifies and traces an object on the basis of the features of the object, which are detected by video equipment, and monitors an event due to movement of the identified object.

Most of existing surveillance systems, which have been developed to identify objects in fixed areas, are configured to extract features of an object in an image taken by a single camera and identify the same object.

However, according to this configuration, the feature information of an object identified in accordance with specifications and surveillance environment including resolution, an angle, and a color tone of a single camera is difficult to use with another type of camera with different specifications and surveillance environment, so it is impossible to determine whether the object photographed by another camera is the same as the object photographed by the single camera, which causes discontinuation in object tracing.

Accordingly, in recent surveillance systems, the surveillance areas of different cameras partially overlap, and when an object detected first by a camera enters an overlap area, the position of the object is shared by other cameras and whether the object is the same as an object identified in an image taken by another camera is determined, thereby keeping tracing the object.

However, according to this configuration, the same types of cameras are used and the surveillance environments and specifications of the cameras should be matched, so the cameras are difficult to be compatible with other cameras, and accordingly, discontinuation is generated in the process of tracing an object, similar to the existing systems.

Further, there is a need for overlap surveillance areas to share the position of an object among cameras, so the surveillance areas are limited and a surveillance system equipped with those cameras has very low efficiency.

DOCUMENTS OF RELATED ART

Patent Document (Patent Document) Korean Patent Application Publication No. 10-2006-0100341.

SUMMARY OF THE INVENTION

An aspect of the present invention is to secure continuation and reliability in object tracing, by accumulatively keeping feature information of the same object detected from images taken by different types of cameras in a surveillance system with the cameras and by keeping tracing the same object with the cameras, which monitor different areas, on the basis of the feature information.

An aspect of the present invention is also to secure efficiency of a surveillance system by supporting the surveillance system such that a wide area is monitored, by keeping tracing the same object detected from different images, by making feature information of the same object, which is extracted from cameras having different surveillance areas, be shared without an overlap surveillance area.

According to an aspect of the present invention, there is provided A surveillance system based on accumulative features of an object that includes: a storing unit that accumulatively keeps feature information of an object extracted from images taken by cameras; an object comparing unit that provides a new object feature information and existing object feature information matched at a predetermined level or more, by comparing the new object feature information about a new object extracted from an image taken by another camera having a surveillance area different from the surveillance areas of the cameras with existing object feature information about existing object accumulatively kept in the storing unit; an object mapping unit that identifies the existing and new objects in images corresponding to object feature information on the basis of the existing and new object feature information provided from the object comparing unit, and accumulatively stores the new object feature information as feature information about the existing object in the storing unit in accordance with user input for whether the identified existing and new object are the same or not; and an object identifying unit that automatically identifies the new object as an object the same as the existing object in the image taken by the another camera in combination with the object comparing unit, when there is existing object feature information matched with the new object feature information at a predetermined reference value or more.

As an example of the present invention, the predetermined reference value may be set higher than the predetermined level.

As an example of the present invention, the system may further include an image processing unit that extracts an object from image received in real time from the cameras or images kept in advance, and extracts feature information about the extracted object.

As an example of the present invention, the image processing unit may extract feature information of an object through any one of a HOG (Histogram of Oriented Gradient), a Haar-like feature, a Co-occurrence HOG, an LBP (local binary pattern), and an FAST (features from accelerated segment test).

As an example of the present invention, the object comparing unit may receive the feature information of an object from an external device including the image processing unit and store the feature information in the storing unit.

As an example of the present invention, the external device may include at least one of a camera, a DVR and a NVR connected with a camera, and an image processor connected with a camera.

As an example of the present invention, the image processing unit may provide information about whether objects picked up by cameras having overlapping surveillance areas are the same, to the object comparing unit, and the object mapping unit may determine whether the new object is the same as an existing object on the basis of the information about identity received through the object comparing unit.

As an example of the present invention, the object mapping unit may assign an identifier to the existing object feature information and store the existing object feature information with the identifier in the storing unit, and assign the same identifier as the identifier assigned to the existing object feature information to new object feature information about a new object the same as the existing object and accumulatively store the new object feature information with the identifier in the storing unit.

As an example of the present invention, when the object comparing unit receive object identification information extracted from an image from a PTZ camera in the cameras, the object comparing unit may transmit control information for zooming in the area around the object and accumulatively stores object feature information extracted from the image of the object zoomed in by the PTZ camera in the storing unit.

As an example of the present invention, the object comparing unit may give priority to feature information about the object extracted from zoomed-in image of the object and accumulatively store the feature information with the priority in the storing unit, and the object identifying unit may determine whether the new object feature information is matched at a predetermined reference value or more on the basis of the feature information with the priority.

According to another aspect of the present invention, there is provided a surveillance method based on accumulated features of an object which includes: receiving new object feature information about a new object extracted from an image taken by a camera, by means of a surveillance server; determining whether there is first existing object feature information matched with the new object feature information at a predetermined reference value or more, in existing object feature information about existing objects extracted from other one or more cameras and stored in advance, by means of the surveillance server; automatically identifying the new object as an object the same as a first existing object corresponding to the first existing object feature information, when there is the first existing object feature information as the result of the determination by the surveillance server; identifying a new object and a second existing object in an image corresponding to object feature information on the basis of new and second existing object feature information, when there is the second existing object feature information matched at a predetermined level or more, by comparing the new object feature information with the existing object feature information stored in advance when there is no first existing object feature information as the result of the determination by the surveillance server; and accumulatively storing the new object feature information as feature information about the existing object in accordance with user input for whether the identified new and second existing objects are the same, by means of the surveillance server.

As an example of the present invention, the predetermined reference value may be set higher than the predetermined level.

BRIEF DESCRIPTION OF THE DRAWINGS

The above and other aspects, features and other advantages of the present invention will be more clearly understood from the following detailed description taken in conjunction with the accompanying drawings, in which:

FIGS. 4A to 5 are diagrams illustrating a process of comparing a new object of a surveillance server with an existing object and determining whether they are the same, according to an embodiment of the present invention;

DETAILED DESCRIPTION OF THE PREFERRED EMBODIMENT

Exemplary embodiments of the present invention will now be described in detail with reference to the accompanying drawings.

Hereinafter, embodiments of the present invention will be described in detail with reference to the drawings.

Figure 1:
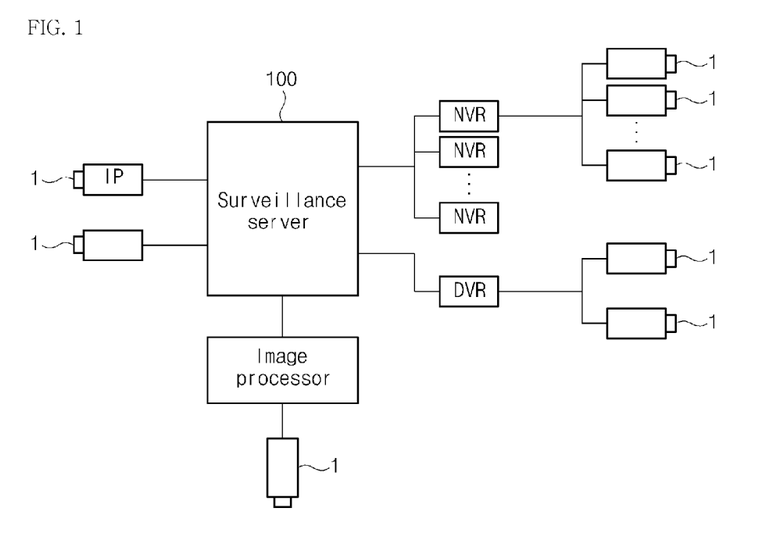
FIG. 1 is a diagram illustrating the configuration of a surveillance system based on accumulated features of an object according to an embodiment of the present invention.

FIG. 1 is a diagram illustrating the configuration of a surveillance system based on accumulate features of an object according to an embodiment of the present invention, and as illustrated in the figure, the surveillance system may include a surveillance server 100 that can accumulatively keep feature information of an object extracted from an image taken by cameras 1 and can easily and automatically identify the same object as the existing object on the basis of the accumulated feature information of the object, when any one of the cameras 1 picks up the object.

The surveillance server 100 may be connected directly to one or more of the cameras 1 through a wire/wireless communication network, to one or more NVRs or DVRs through the communication network, or an image processor through the communication network.

The NVR, DVR, and image processor may be connected with one or more of the cameras 1 and receive images.

Further, at least one of the cameras 1 may be an IP camera.

Figure 2:
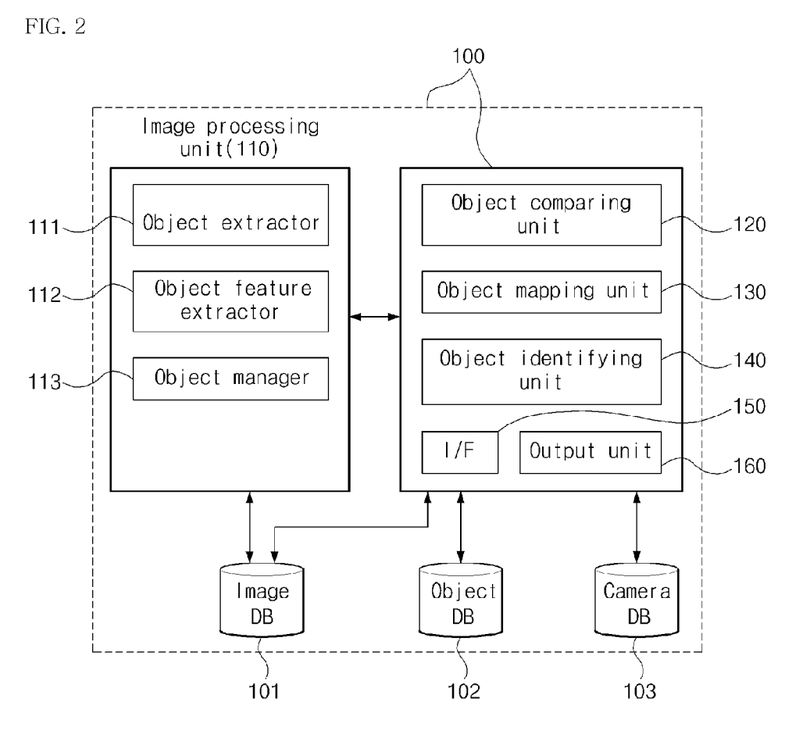
FIG. 2 is a diagram illustrating in detail a surveillance server according to an embodiment of the present invention.

FIG. 2 is a diagram illustrating in detail the surveillance server 100 according to an embodiment of the present invention, in which the surveillance server 100 may include an object comparing unit 120, an object mapping unit 130, an object identifying unit 140, an interface unit 150, and an output unit 160.

The object comparing unit 120, first, receives object feature information of an object extracted from images taken by one or more cameras monitoring different areas and compares it with object feature information kept in an object DB 102, and when there is no object feature information not matched with the object feature information at a predetermined level or more, the object comparing unit 120 can transmit the object feature information to the object mapping unit 130.

Further, when receiving only the object feature information from the object comparing unit 120, the object mapping unit 130 determines that it is a new object, and can assign an identifier to the object feature information for the new object and store it in the object DB 102.

Meanwhile, a configuration when there is object feature information matched with the object feature information at a predetermined level or more will be described in detail below.

The surveillance server 100 may further include an image processing unit 110 transmitting object feature information to the object comparing unit 120 and the image processing unit 110 may include an object extractor 111, an object feature extractor 112, and an object manager 113, as illustrated in the figure.

The image processor 110 can receive an image from at least one of the cameras, NVR, DVR, and image processor and the object extractor 111 can extract an object from the image, using various algorisms for extracting objects such as a difference image method or a background modeling method.

The image processing unit 110 can extract an object from image received in real time and may extract an image selected by user input through the interface unit 150 from the image DB 101 after keeping the image by being connected with the image DB 101.

Further, the object feature extractor 112 can extract object feature information of the extracted object. The object feature extractor 112 can extract object feature information using various algorisms for extracting object features, such as a HOG (Histogram of Oriented Gradient), a Haar-like feature, a Co-occurrence HOG, an LBP (local binary pattern), and an FAST (features from accelerated segment test).

Further, the object manager 113 can identify an object from an image taken by a specific camera on the basis of the object feature information extracted by the object feature extractor 112, collect object feature information continuously extracted for the same object, and transmit the collected object feature information to the object comparing unit 120. The object manager 113 can continuously trace the same object using an object trace method that uses a Kalman filter and can collect object feature information provided from the object feature extractor 112 on the basis of the extracted object as object feature information of the same object.

Meanwhile, the object manager 113 can transmit image information corresponding to the object feature information to the object comparing unit 120 with the object feature information, or map and store the image information in the image DB 101 connected with the surveillance server 110 with the object feature information.

In this configuration, the image processing unit 110 may be included in the surveillance server 100 or may be equipped on external devices such as the cameras, NVR, DVR, and image processor. Accordingly, when the image processing unit 110 and the surveillance server 100 are separated, the object comparing unit 120 of the surveillance server 100 can receive the object feature information from the external devices.

The surveillance server 100 can keep accumulating object feature information extracted from images taken by different cameras, as described above, by the image processing unit 110, and can easily determine whether it is the same object by comparing object feature information extracted from another camera, which is different from the cameras corresponding to the images from which the object feature information has been extracted, or which has a different surveillance area, with existing accumulate object feature information.

Therefore, it is possible to keep tracing an object moving through different surveillance areas and trace the object in the surveillance areas, so continuous tracing for a wide area can be achieved.

An embodiment for this purpose is described in detail with reference to FIGS. 3 to 7 on the basis of the configuration described above.

Figure 3:
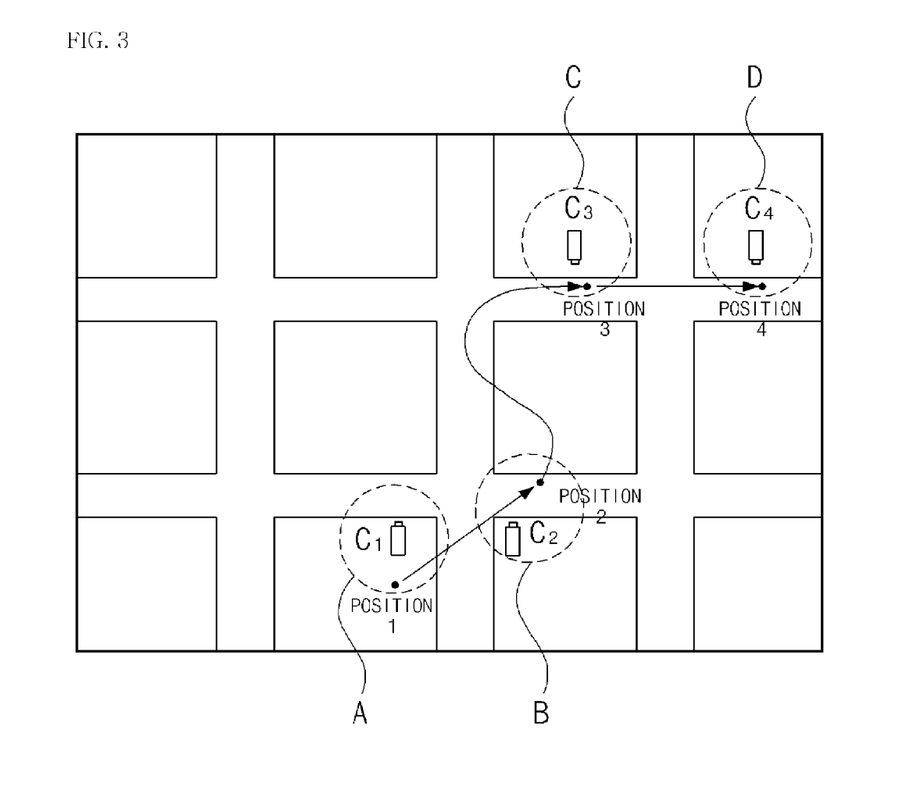
FIG. 3 is an exemplary diagram of an object moving through a plurality of surveillance areas of different cameras according to an embodiment of the present invention.

First, as illustrated in FIG. 3, an object to be monitored passes through the areas A, B, C, and D while it moves from the first position to the fourth position and there are differences in images taken by the first to fourth cameras C1, C2, C3, and C4 disposed to monitor the areas, respectively, due to the specifications and angles of the cameras.

For example, the resolution, color tones, and angles of images depend on the different specifications and angles of cameras, so that even if objects extracted from the images are the same, different values depending on the resolution, color tones, and angles are obtained when feature information is extracted.

Accordingly, the image processing unit 110 identifies the same objects in the images taken by different cameras as different objects, so reliability and efficiency in object tracing are deteriorated. Further, the object is traced only in the surveillance areas of the cameras, so it is impossible to continuously monitor an object.

Figure 4A:
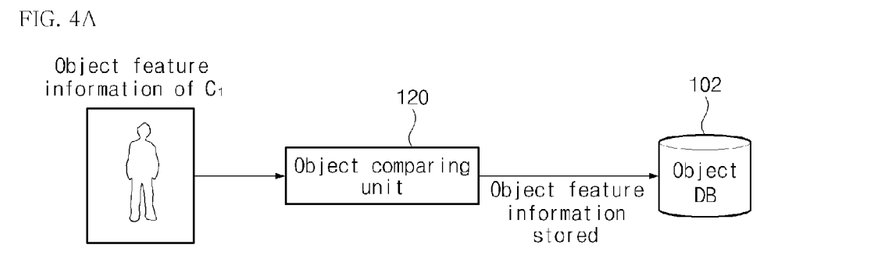

In order to solve this problem, as illustrated in FIG. 4A, the object comparing unit 120 can receive object feature information obtained by the image processing unit 110 from the image taken by the first camera C1 having a different surveillance area.

The image processing unit 110 determines whether the object moving through surveillance area of the first camera C1 is the same object or not on the basis of the object feature information, and can trace the same object on the basis of the determination, and for example, it may use an object trace method using a Kalman filter.

Meanwhile, the image processing unit 110 can continuously extract a plurality of items of object feature information from various postures and positions of the same object and transmit them to the object comparing unit 120, and it may transmit image information corresponding to the object feature information to the object comparing unit 120.

The object comparing unit 120 may extract object feature information and image information selected by user input through the interface unit 150 from the image DB 101 keeping object feature information and image information that have been mapped.

Meanwhile, the object comparing unit 120 can receive object feature information continuously extracted and transmitted by the image processing unit 110 in the surveillance area of the first camera C1 and determine whether there is object feature information matched with the object feature information at a predetermined level or more in the object DB 102.

When there is no object feature information matched with the object feature information at a predetermined level as the result of comparing them, the object comparing unit 120 can transmit object feature information to the object mapping unit 130.

Accordingly, when the object mapping unit 130 receive only object feature information from the object comparing unit 120, it determines that there is no existing object corresponding to the object feature information and can assign a new identifier to the object corresponding to the object feature information and can map the identifier with the object feature information and then accumulatively store them into the object DB 102.

Figure 4B:
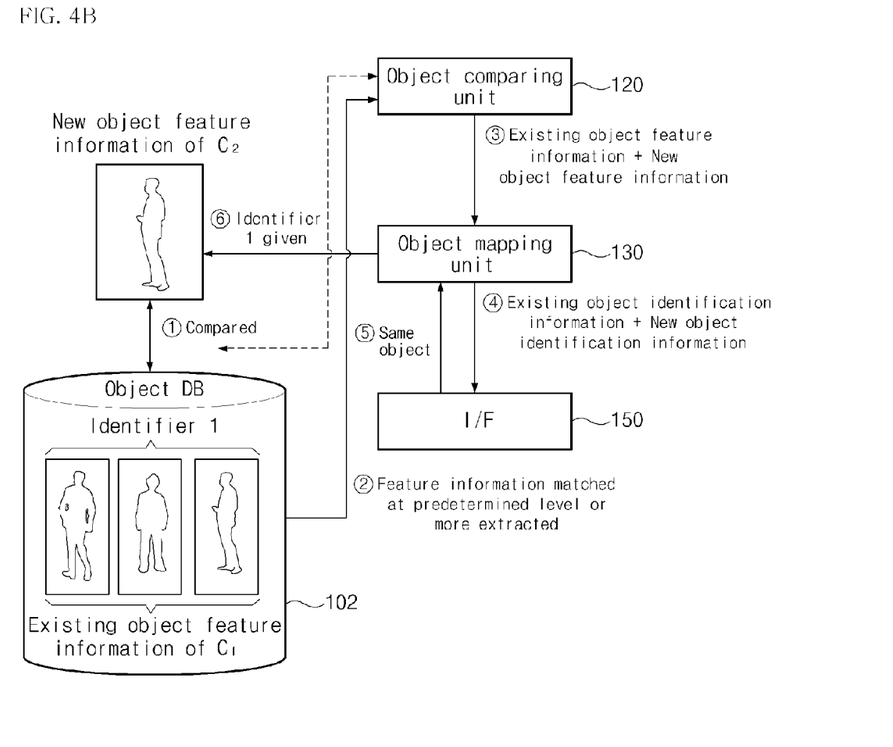

Meanwhile, when the object corresponding to the object feature information extracted from the first camera C1 moves to the surveillance area of the second camera C2, the object comparing unit 120, as illustrated in FIG. 4B, cannot know whether object feature information obtained from the image taken by the second camera C2 through the image processing unit 110 is the same as the object extracted from the image taken by the first camera, so it identifies the object feature information as new object feature information for a new object.

Accordingly, when the object comparing unit 120 receives new object feature information obtained from the image taken by the second camera C2 through the image processing unit 110, it compares the new object feature information with existing object feature information corresponding to the first camera C1 which is kept in the object DB 102, and when there is object feature information matched with the new object feature information at a predetermined level or more, the object comparing unit 120 can extract and provide the object feature information to the object mapping unit 130.

When the object mapping unit 130 receives the new object feature information and the existing object feature information from the object comparing unit 120, it can create existing object identification information by identifying an object on the basis of the existing object feature information from an image according to the image information corresponding to the first camera C1 in the image information mapped with object feature information and kept in the image DB 101 and can create new object identification information by identifying an object on the basis of the new object feature information from an image according to image information corresponding to the second camera C2. The object identification information may say which object is in which area in the image.

Accordingly, the object mapping unit 130 can display the area of an existing object identified on the basis of the existing object identification information in the image corresponding to the first camera C1 and can display the area of new object identified on the basis of the new object identification information in the image corresponding to the second camera C2, through the output unit 160.

The output unit 160 may be a display unit that receives and displays information from the object mapping unit 130. Further, the output unit 160 may be connected with an output device such as an external display, receive information from the object mapping unit 130, and then transmit it to the output device for outputting, and it may be a display unit separate from the surveillance server 100.

Next, the object mapping unit 130 can receive whether the existing object identified from the image taken by the first camera C1 is the same as the new object identified from the image taken by the second camera C2 on the basis of user input through the interface unit 150, and when they are the same, the object mapping unit 130 can assign the identifier, which has been assigned to existing object feature information matched with the new object feature information at a predetermined level or more, to the new object feature information and map it to the identifier and accumulatively store it in the object DB 102.

In other words, the object mapping unit 130 can accumulatively store the new object feature information as feature information about the existing object in the object DB 102, so it is possible to expand feature information available for identifying objects by accumulatively storing various items of feature information about objects identified from images taken by different cameras.

Therefore, even if a camera having an angle, specifications, and a surveillance environment different from those of the existing cameras is added, the surveillance server 100 supports the system so that the system can easily identify an object from an image taken by the added camera, using the accumulatively stored feature information, by keeping feature information about objects photographed under various angles, specifications, and surveillance environments of cameras.

Figure 5:
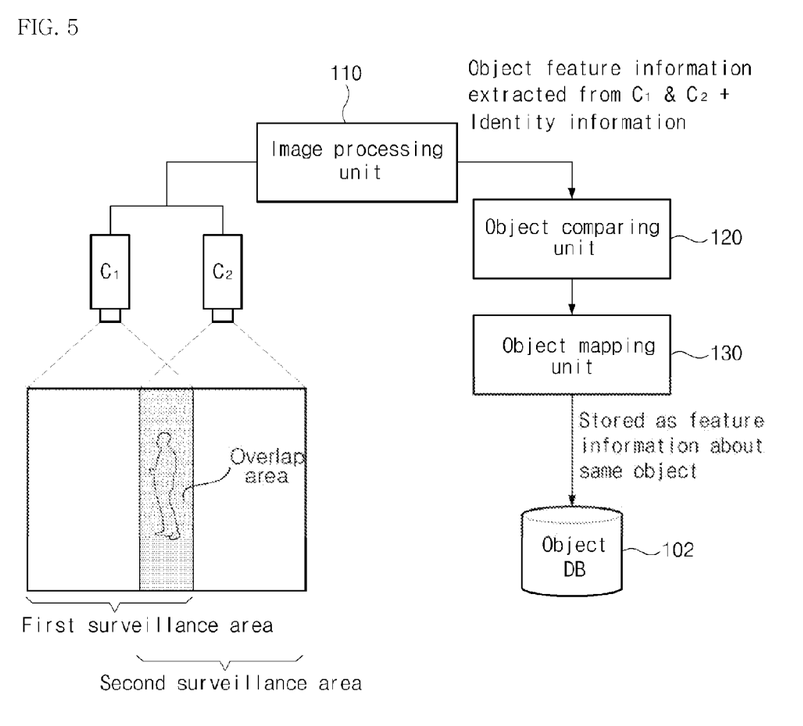

As illustrated in FIG. 5, when a first surveillance area A corresponding to the first camera C1 and a second surveillance area B corresponding to the second camera C2 overlap each other, the image processing unit 110 can create identity information by determining whether the object moving from the first surveillance area A to the second surveillance area B is the same in the overlap area on the basis of object feature information, and transmit the identity information to the object comparing unit 120.

Accordingly, when receiving the identity information with object feature information corresponding to the first and second cameras C1 and C2, the object comparing unit 120 provides it to the object mapping unit 130, and the object mapping unit 130 can map object feature information corresponding to the first and second cameras C1 and C2 to the same identifier of the same object in accordance with the identity information without receiving user input through the interface unit 150 and accumulatively store it in the object DB 102.

When feature information about objects over a predetermined number is accumulated in the object DB 102 and the match degree of new object feature information received from the image processing unit 110 and the existing object feature information becomes high, the surveillance server 100 according to an embodiment of the present invention can identify an object by automatically determining whether it is the same object without receiving user input.

Figure 6:
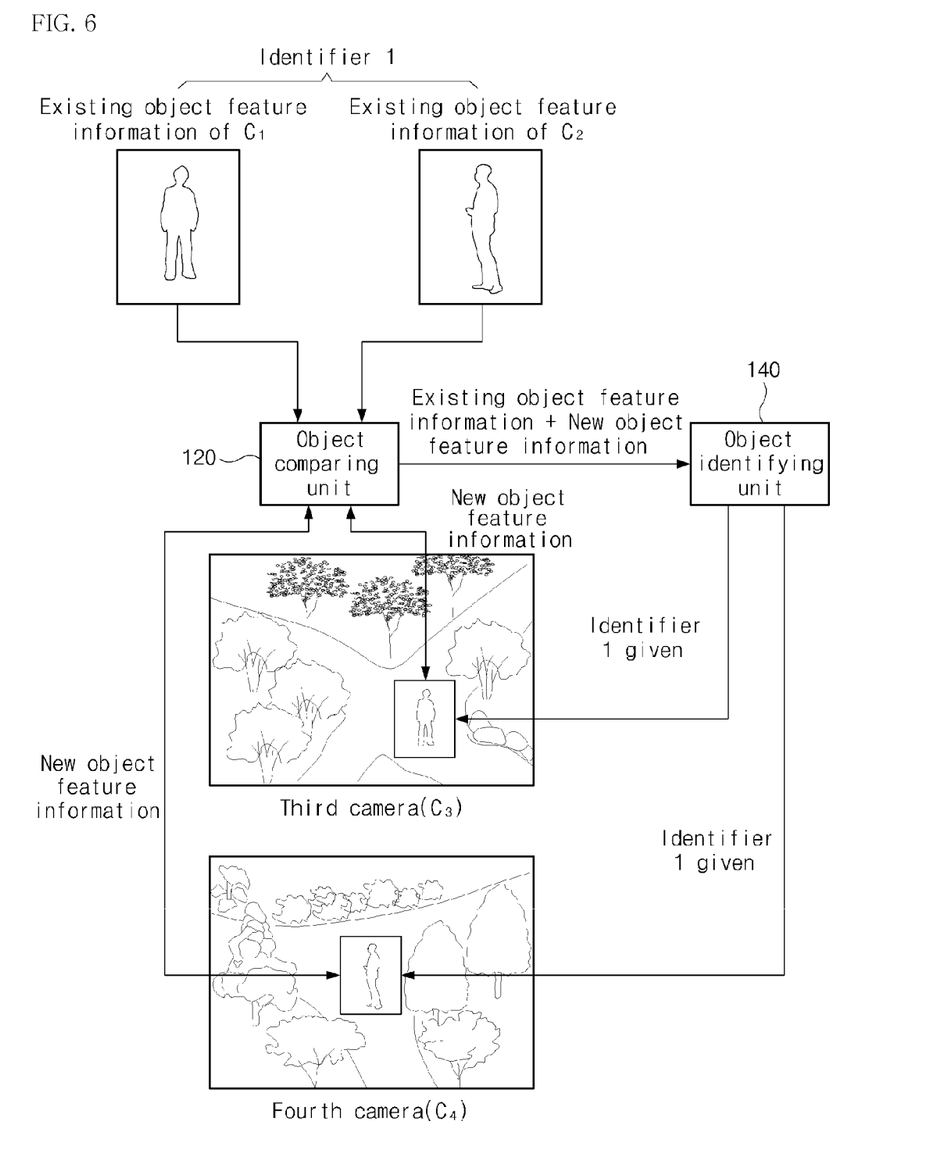
FIG. 6 is a diagram illustrating a process of identifying an object the same as an existing object from images taken by different cameras on the basis of feature information of the existing object which is extracted and accumulated from an image taken by an existing camera of the surveillance server.

Referring to FIG. 6, when an object that has passed through the surveillance areas of the first and second cameras C1 and C2 enters the surveillance area C for the third camera C3, the object comparing unit 120 can receive another new object feature information extracted from the image taken by the third camera C3 through the image processing unit 110, and when there is existing object feature information matched with the new object feature information at a predetermined reference value or more in the object DB 102, the object comparing unit 120 can transmit the new object feature information and the existing object feature information matched with the new object feature information at the predetermined reference value or more to the object identifying unit 140.

The predetermined reference value may be set higher than the predetermined level.

Further, when there is no existing object feature information matched with the new object feature information at the predetermined reference value or more in the object DB 102, the object comparing unit 120 determines whether there is existing object feature information matched with the new object feature information at a predetermined level or more in the object mapping unit 130, and when there is existing object feature information matched with the new object feature information at the predetermined level or more, the process by the object mapping unit 130 is performed, and accordingly, the new object feature information can be mapped to the identifier corresponding to an existing object and accumulatively stored in the object DB 102.

Meanwhile, when the object identifying unit 140 receives the new object feature information and the existing object feature information from the object comparing unit 120, it identifies an object from the image corresponding to the third camera C3 stored in the image DB 101 on the basis of the new object feature information and create object identification information corresponding to the third camera C3 by extracting the identifier mapped to the existing object feature information, which is matched with the new object feature information at a predetermined reference value or more, from the object DB 102 and then by assigning the identifier to the identified object. The object identifying unit 140 can receive in real time the image corresponding to the third camera C3 from the object comparing unit 120 and can create object identification information corresponding to the third camera C3 by identifying the object from the image.

Accordingly, the object identifying unit 140 can display the area of the object identified on the basis of the object identification information corresponding to the third camera C3 in the image corresponding to the third camera C3 through the output unit 160 and can display the identifier included in the object identification information corresponding to the third camera C3 in the area of the object, so that a user can know that the object identified from the image taken by the third camera C3 is the same object as an existing object.

The output unit 160 may be a display unit that receives and displays information from the object identifying unit 140. Further, the output unit 160 may be connected with an output device such as an external display, receive information from the object identifying unit 140, and then transmit it to the output device for outputting, and it may be a display unit separate from the surveillance server 100.

The object identifying unit 140 can map the identifier mapped in existing object feature information matched at the predetermined reference value or more in the object DB 102 and new object feature information and accumulatively store them in the object DB 102, on the basis of the new object feature information and the existing object feature information matched with the predetermined reference value or more that are received from the object comparing unit 120. That is, the object identifying unit 140 can accumulatively store feature information about a new object in the object DB 102, as feature information of an existing object matched at a predetermined reference value.

Meanwhile, in this configuration, the predetermined reference value may be set in the object identifying unit 140 and the object identifying unit 140 can receive not only the new object feature information, but all of new object feature information first from the object comparing unit 120, in combination with the object comparing unit 120, or can receive all of new object feature information directly from the image processing unit 110.

For example, the object identifying unit 140 may receive new object feature information from the object comparing unit 120 or receive new object feature information directly from the image processing unit 110, and when there is existing object feature information matched with the new object feature information at the predetermined reference value or more in the object DB 102, it may create the object identification information and then perform the process of displaying the identified object on the basis of the object identification information. Further, when there is no existing object feature information matched with the new object feature information at the predetermined reference value or more in the object DB 102, it can allow for the process of comparing the new object feature information with the existing object feature information matched at the predetermined level or more and of determining and accumulatively storing the same object in accordance with user input through the object mapping unit 130, by transmitting the new object feature information to the object comparing unit 120.

According to this configuration, the surveillance server 100 can obtain a plurality of data about feature information corresponding to the same object from a plurality of cameras, can support the system to easily identify and continuously trace the same object in an image taken by another camera having a surveillance area different from those of the plurality of cameras on the basis of the data. Obviously, the surveillance server 100 can identify the same object on the basis of the data in the images taken by the plurality of cameras.

Further, since the surveillance server 100 can continuously trace the same object in the surveillance areas of the all cameras by easily identifying the same object in the images taken by the cameras having different surveillance areas, it is possible to expand the entire surveillance area.

On the other hand, as illustrated in FIG. 3, even though an object enters the surveillance area D of the fourth camera C4 through the surveillance area C of the third camera C3, as illustrated in and described with reference to FIG. 6, the surveillance server 100 can easily identify the same object in the image taken by the fourth camera C4 on the basis of the existing object feature information accumulatively stored for the same object in the images taken by the first to third cameras C1 to C3. Further, when there is no same object, the surveillance server 100 can supplement the data about the same object by asking a user whether the object in the image taken by the fourth camera C4 is the same as the existing object, when it is the same, so it is possible to increase reliability and accuracy in identifying of the same object.

Meanwhile, as illustrated in the figure, when at least one of the first to fourth cameras C1 to C4 is a PTZ camera, it is possible to obtain more accurate feature information about an object by zooming in an image, which is described in detail with reference to FIGS. 7A and 7B.

Figure 7A:
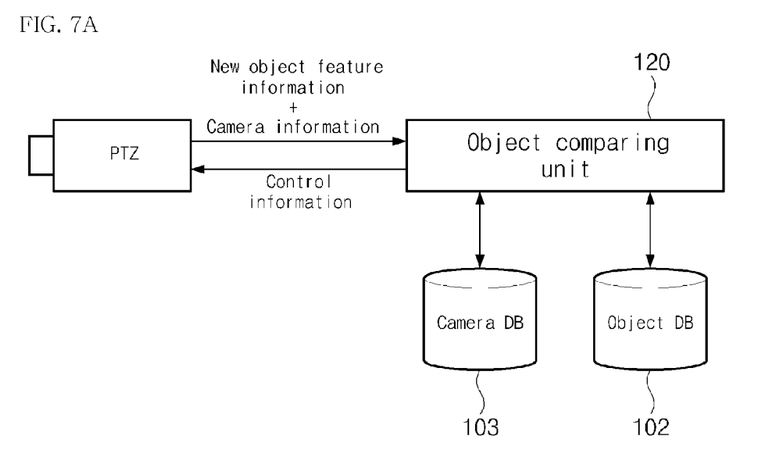
FIGS. 7A and 7B are diagrams illustrating a process of extracting and accumulating feature information of an object from an enlarged image of the surveillance server according to an embodiment of the present invention.

First, as illustrated in FIG. 7A, the object comparing unit 120 can identify a PTZ camera by comparing camera information kept in a camera DB 103 on the basis of camera identification information included in image information received with new object feature information.

Further, the object comparing unit 120 compares new object feature information extracted from the image taken by the PTZ camera with existing object feature information accumulatively stored in the object DB 102, and when there is existing object feature information matched at a predetermined level or more, the object comparing unit 120 can transmit control information for zooming in an object corresponding to the new object feature information to the PTZ camera or the external devices connected to the PTZ camera.

When the object identifying unit 140 receives the new object feature information, it compares new object feature information extracted from the image taken by the PTZ camera with existing object feature information accumulatively stored in the object DB 102, and when there is existing object feature information matched at a predetermined reference value or more, it can transmit control information for zooming in an object corresponding to the new object feature information to the PTZ camera or the external devices connected to the PTZ camera.

Figure 7B:
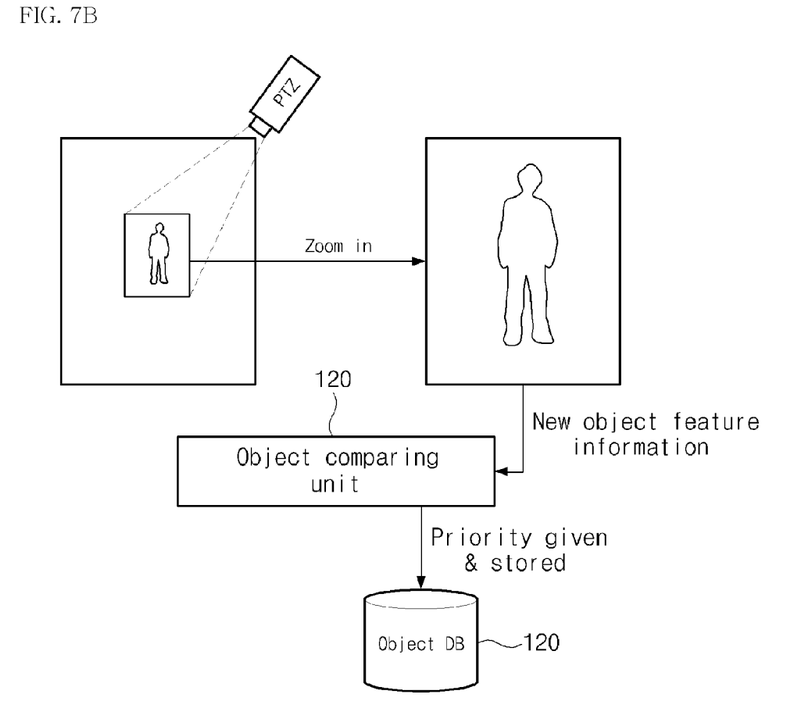

Accordingly, as illustrated in FIG. 7B, the image processing unit 110 can extract new object feature information from the image of the enlarged object zoomed in by the PTZ camera on the basis of the control information and transmit the new object feature information to the object comparing unit 120.

The image processing unit 110 receives response information corresponding to the control information with image information about the enlarged image corresponding to the PTZ camera and can transmit the response information with the new object feature information to the object comparing unit 120.

Therefore, the object comparing unit 120 can identify the new object feature information extracted from the image enlarged in accordance with the control information, on the basis of the response information.

Meanwhile, the object comparing unit 120 can receive the new object feature information extracted from the enlarged image, and map it to an identifier corresponding to an existing object and accumulatively stores it in the object DB 102 on the basis of user input, and can give priority to the object feature information extracted from the enlarged image and then store it in the object DB 102.

Accordingly, the object comparing unit 120 may compare first the new object feature information received after the object feature information having priority is stored, with the object feature information having priority to find out whether they are matched at a predetermined level or more, or may provide new object feature information and the object feature information having priority to the object identifying unit 140 only when the new object feature information is matched with the object feature information having priority at a predetermined reference value.

Accordingly, the object identifying unit 140 can determine whether the new object feature information is matched at a predetermined reference value or more on the basis of the object feature information having priority, such that it is possible to not only obtain more accurate feature information by enlarging an object, but increase reliability in tracing the same object.

Figure 8:
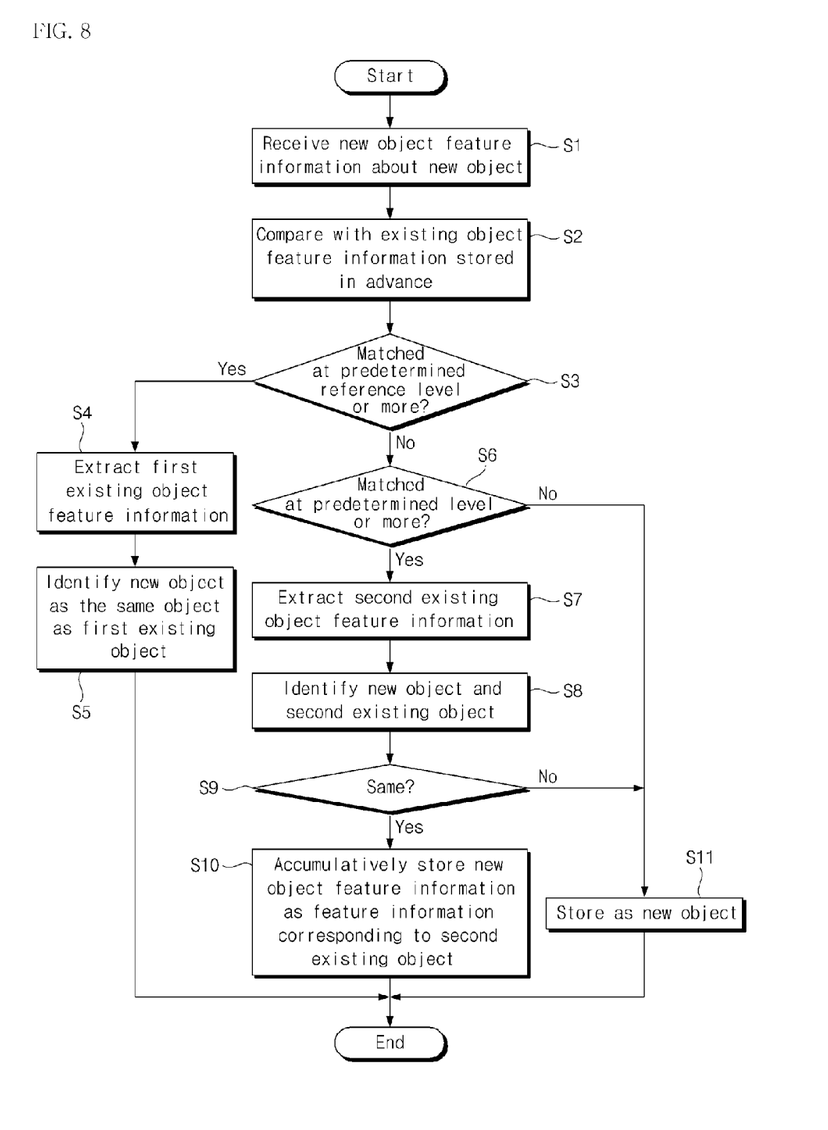
FIG. 8 is a flowchart illustrating a surveillance method based on accumulated features of an object according to an embodiment of the present invention.

FIG. 8 is a flowchart illustrating a surveillance system based on accumulative object features according to an embodiment of the present invention, in which the surveillance server 100 can receive new object feature information about a new object extracted from an image taken by a camera (S1).

Next, the surveillance server 100 can determine whether there is first existing object feature information that is matched with the new object feature information at a predetermined reference value or more in existing object feature information about existing objects extracted images from other cameras and accumulatively store in advance (S2 and S3).

When there is the first existing object feature information as the result of determination (S3), the surveillance server 100 can automatically identify the new object as an object the same as a first existing object corresponding to the first existing object feature information (S4 and S5).

Further, when there is no first existing object feature information as the result of determination (S3), the surveillance server 100 can determine whether there is second existing object feature information matched at a predetermined level or more, by comparing the new object feature information with existing object feature information stored in advance (S6).

When there is the second existing object feature information (S6), the surveillance server 100 can identify the new object and a second existing object corresponding to the second existing object feature information in images corresponding to the object feature information (S8), on the basis of the new object feature information and the second existing object feature information (S7).

Thereafter, the surveillance server 100 can accumulatively store the new object feature information as feature information about the second object (S10), in accordance with user input for whether the identified new object and the second existing object are the same or not (S9).

When there is no second existing object feature information (S6) or when they are not the same in accordance with user input (S9), the surveillance server 100 can keep the new object feature information as feature information about the new object (S11).

Embodiments of the present invention were described above with reference to the drawings. However, the present invention is not limited to the embodiments and may be modified in various ways by those skilled in the art without departing from the scope of the present invention described in claims.

As set forth above, according to exemplary embodiments of the invention, the present invention ensures and accumulatively stores a plurality of data about feature information corresponding to an object picked up by a plurality of cameras and easily identifies the same object in an image taken by another camera having a surveillance area different from those of the plurality of cameras on the basis of the data, thereby allowing for continuous tracing. Therefore, it is possible to ensure reliability and efficiency of a system. Further, since it is possible to keep tracing the same object in the surveillance areas of all of cameras by easily identifying the same object in images taken by the cameras having different surveillance areas, it is possible to expand the entire surveillance area.

Further, according to the present invention, even if a camera having surveillance environment and specifications different from those of existing cameras, it is possible to easily identify the same object through a corresponding camera on the basis of accumulated feature information of the same object extracted from different cameras having different surveillance environments and specifications. Therefore, it is possible to keep trace an object with ease even without considering a compatible configuration for different cameras, so it is possible to considerably increase efficiency of a system and reduce the manufacturing cost of the system.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A surveillance system based on accumulative features of an object, comprising:
one or more units being configured and executed by a processor using algorithm, the algorithm which when executed, causing the processor to perform the one or more units, the one or more units comprising,
a storing unit that accumulatively keeps feature information of an object extracted from images taken by cameras;
an object comparing unit that provides a new object feature information and existing object feature information matched at a predetermined level or more in response to determination of a result by comparing the new object feature information about a new object extracted from an image taken by another camera having a surveillance area different from the surveillance areas of the cameras with existing object feature information about existing object accumulatively kept in the storing unit;

an object mapping unit that identifies the existing and new objects in images corresponding to object feature information on the basis of the existing and new object feature information provided from the object comparing unit, and accumulatively stores the new object feature information as feature information about the existing object in the storing unit in accordance with user input for whether the identified existing and new object are the same or not; and an object identifying unit that automatically identifies the new object as an object the same as the existing object in the image taken by the another camera in combination with the object comparing unit in response to existence of object feature information being matched with the new object feature information at a predetermined reference value or more.

2. The surveillance system of claim 1, wherein the predetermined reference value is set higher than the predetermined level.

3. The surveillance system of claim 1, further comprising an image processing unit that extracts an object from image received in real time from the cameras or images kept in advance, and extracts feature information about the extracted object.

4. The surveillance system of claim 3, wherein the image processing unit extracts feature information of an object through any one of a HOG (Histogram of Oriented Gradient), a Haar-like feature, a Co-occurrence HOG, an LBP (local binary pattern), and an FAST (features from accelerated segment test).

5. The surveillance system of claim 3, wherein the object comparing unit receives the feature information of an object from an external device including the image processing unit and stores the feature information in the storing unit.

6. The surveillance system of claim 5, wherein the external device includes at least one of a camera, a DVR and a NVR connected with a camera, and an image processor connected with a camera.

7. The surveillance system of claim 3, wherein the image processing unit provides information about whether objects picked up by cameras having overlapping surveillance areas are the same, to the object comparing unit, and the object mapping unit determines whether the new object is the same as an existing object on the basis of the information about identity received through the object comparing unit.

8. The surveillance system of claim 1, wherein the object mapping unit assigns an identifier to the existing object feature information and stores the existing object feature information with the identifier in the storing unit, and assigns the same identifier as the identifier assigned to the existing object feature information to new object feature information about a new object the same as the existing object and accumulatively stores the new object feature information with the identifier in the storing unit.

9. The surveillance system of claim 1, wherein when the object comparing unit receive object identification information extracted from an image from a PTZ camera in the cameras, the object comparing unit transmits control information for zooming in the area around the object and accumulatively stores object feature information extracted from the image of the object zoomed in by the PTZ camera in the storing unit.

10. The surveillance system of claim 9, wherein the object comparing unit gives priority to feature information about the object extracted from zoomed-in image of the object and accumulatively stores the feature information with the priority in the storing unit, and the object identifying unit determines whether the new object feature information is matched at a predetermined reference value or more on the basis of the feature information with the priority.

11. A surveillance method based on accumulated features of an object, the method comprising:

receiving new object feature information about a new object extracted from an image taken by a camera, by means of a surveillance server;

determining whether there is first existing object feature information matched with the new object feature information at a predetermined reference value or more, in existing object feature information about existing objects extracted from other one or more cameras and stored in advance, by means of the surveillance server;

automatically identifying the new object as an object the same as a first existing object corresponding to the first existing object feature information, when there is the first existing object feature information as the result of the determination by the surveillance server;

identifying a new object and a second existing object in an image corresponding to object feature information on the basis of new and second existing object feature information, when there is the second existing object feature information matched at a predetermined level or more, by comparing the new object feature information with the existing object feature information stored in advance when there is no first existing object feature information as the result of the determination by the surveillance server; and accumulatively storing the new object feature information as feature information about the existing object in accordance with user input for whether the identified new and second existing objects are the same, by means of the surveillance server, wherein the accumulatively storing of the new object feature information as feature information about the existing object gives an identifier to the existing object feature information and then stores the existing object feature information with the identifier, and gives an identifier the same as the identifier given to the existing object feature information to new object feature information about a new object the same as the existing object and then accumulatively stores the new object feature information with the identifier.

12. The surveillance method of claim 11, wherein the predetermined reference value is set higher than the predetermined level.

* * * * *